(12) United States Patent
Campbell et al.

(10) Patent No.: US 10,666,884 B1
(45) Date of Patent: May 26, 2020

(54) METHOD OF CLASSIFYING AND CORRECTING IMAGE SENSOR DEFECTS UTILIZING DEFECTIVE-PIXEL INFORMATION FROM COLOR CHANNELS

(71) Applicant: Foveon, Inc., San Jose, CA (US)

(72) Inventors: Dwayne A. Campbell, San Jose, CA (US); Svetlana P. Piner, Santa Clara, CA (US)

(73) Assignee: Foveon, Inc., San Jose, CA (US)

( * ) Notice: Subject to any disclaimer, the term of this patent is extended or adjusted under 35 U.S.C. 154(b) by 0 days.

(21) Appl. No.: 16/292,240

(22) Filed: Mar. 4, 2019

(51) Int. Cl.
*H04N 5/367* (2011.01)
*H04N 5/217* (2011.01)
*H04N 9/04* (2006.01)
*H04N 5/359* (2011.01)

(52) U.S. Cl.
CPC ......... *H04N 5/3675* (2013.01); *H04N 5/2178* (2013.01); *H04N 5/359* (2013.01); *H04N 9/045* (2013.01)

(58) Field of Classification Search
None
See application file for complete search history.

*Primary Examiner* — Mark T Monk
(74) *Attorney, Agent, or Firm* — Glass and Associates; Kenneth D'Alessandro; Kenneth Glass (57) ABSTRACT

A method of classifying and correcting defects in vertical color pixel sensors in utilizing defective pixel information, the method includes defining ranges of output levels of normal pixel sensors from exposure to dark and bright flat field light sources. Dark and bright images are captured, and pixel outputs are measured for each image. Pixels in the dark and bright images having outputs in at least one color channel that are outside of the ranges of the output levels of normal pixel sensors are entered into defective pixel maps. The defective pixels are classified into categories and defective pixel sensors that can be corrected are identified. Correction values for identified defective pixel sensors that can be corrected are generated and entered into a calibration memory associated with the vertical color image sensor.

13 Claims, 10 Drawing Sheets

METHOD OF CLASSIFYING AND CORRECTING IMAGE SENSOR DEFECTS UTILIZING DEFECTIVE-PIXEL INFORMATION FROM COLOR CHANNELS

BACKGROUND

The present invention relates to integrated circuit technology. More particularly, the present invention relates to imager integrated circuits and to multi-color-channel integrated circuits, and to methods for classifying and correcting vertical color image sensor defects utilizing all color channel information of each defective pixel.

Defects are well known issues in CMOS color image sensors including both vertical color sensors such as the X3 sensor manufactured and marketed by Foveon, Inc., of San Jose, Calif., as well as traditional types of color image sensors. Defects are a cost issue as they negatively affect the yield at various steps of manufacturing. Sensor defects include pixel clusters in the image sensor sharing a common defect in one or more integrated circuit layers, particles on the die surface, and window defects. Prior-art methods have been used to detect defects but have minimal classification capabilities.

Defects are a cost issue as they affect the yield at various steps of manufacturing. Defects can be introduced during different phases of the manufacturing flow, including integrated circuit fabrication, glass manufacturing, and sensor assembly.

Traditional testing for defects does not employ defect classification. During the testing phase of image sensor manufacturing, defect tests are implemented. Sensors having defects that are too large and/or too numerous are rejected. The size and quantity of defects are the main characteristics of defects with this traditional type of testing. Information that is useful for yield enhancement or defect correction is limited with the prior-art approach.

Defect classification presents several challenges. Identifying the different types of defects is a challenge for the testing phase of manufacturing for multiple reasons. There are numerous types of pixel clusters that share many of the same traits. Particles on the die surface are hard to distinguish from some types of pixel cluster defects. Window defects are hard to distinguish from die surface particles and from some types of pixel cluster defects.

BRIEF DESCRIPTION

The classification and correction methods of the present invention can be applied to vertical color pixel image sensors such as Foveon X3 image sensors because all color channel information is available for every X3 pixel sensor in the image sensor.

This method is not available to apply to Bayer filter sensors because all color channel information is not available for every pixel.

In accordance with one aspect of the present invention, a method of classifying and correcting defects utilizing defective pixel information in a vertical color image sensor including an array of pixel sensors with multiple color channels includes capturing at least two dark images on the vertical color image sensor using a dark flat field, capturing at least two bright images on the vertical color image sensor using a bright flat field light source, examining the output of each color channel of each pixel sensor for the captured dark and bright images, defining output levels of color channels of normal pixel sensors from the at least two bright images and the at least two dark images, from the dark image identifying and entering into a first defective pixel map pixel sensors having an output in at least one color channel that is lower than the output level of a normal pixel sensor by more than a threshold amount, from the dark image identifying and entering into a second defective pixel map pixel sensors having an output in at least one color channel that is higher than the output level of a normal pixel sensor by more than a threshold amount, from the bright images identifying and entering into a third defective pixel map pixel sensors having an output in at least one color channel that is lower than the output level of a normal pixel sensor by more than a threshold amount, from the bright images identifying and entering into a fourth defective pixel map pixel sensors having an output in at least one color channel that is higher than the output level of a normal pixel sensor by more than a threshold amount, and from the defective pixel maps identifying defective pixel sensors that can be corrected, and generating and entering into a calibration memory associated with the vertical color image sensor correction values for identified defective pixel sensors that can be corrected.

According to another aspect of the invention, the method includes installing the vertical color image sensor into a digital camera, and downloading into a calibration memory in the digital camera the correction values for identified defective pixel sensors of the vertical color image sensor that can be corrected.

According to another aspect of the invention the method includes determining whether the number of clustered defective pixels identified in the defective pixel maps is larger than a predetermined threshold, rejecting the vertical color image sensor if the number of clustered defective pixels identified in the defective pixel maps is larger than the predetermined threshold.

According to another aspect of the invention the method includes cleaning a window covering the vertical color image sensor, and deleting from the defective pixel maps any pixel sensors whose outputs are equal to outputs of normal pixel sensors after cleaning the window.

According to another aspect of the invention, generating and entering into a calibration memory associated with the vertical color image sensor correction values for identified defective pixel sensors that can be corrected includes generating and entering into the calibration memory associated with the vertical color image sensor correction values for identified defective pixel sensors that have offset defects only if the number of identified defective pixel sensors that have offset defects is less than a predetermined threshold number.

According to another aspect of the invention, generating and entering into a calibration memory associated with the vertical color image sensor correction values for identified defective pixel sensors that can be corrected includes generating and entering into the calibration memory associated with the vertical color image sensor correction values for identified defective pixel sensors that have stuck-at defects only if the number of identified defective pixel sensors that have stuck-at defects is less than a predetermined threshold number.

According to another aspect of the invention, generating and entering into a calibration memory associated with the vertical color image sensor correction values for identified defective pixel sensors that can be corrected includes generating and entering into the calibration memory associated with the vertical color image sensor correction values for identified defective pixel sensors that have gain defects only if the number of identified defective pixel sensors that have gain defects is less than a predetermined threshold number.

According to another aspect of the invention a method of classifying and correcting defects in vertical color pixel sensors in a vertical color pixel image sensor, the method includes capturing at least two dark images on the vertical color image sensor using a dark flat field, capturing at least two bright images on the vertical color image sensor using a bright flat field light source, examining the output of each color channel of each pixel sensor for the captured dark and bright images, defining ranges of output levels of color channels of normal pixel sensors from the at least two bright images and the at least two dark images, entering into at least one defective pixel map pixels from the at least two bright images and the at least two dark images that have outputs in at least one color channel that are outside of the defined ranges of the output levels of normal pixel sensors, from data in the defective pixel maps assigning a defect classification to each defective pixel sensor and identifying defective pixel sensors that can be corrected, and generating correction values for identified defective pixel sensors that can be corrected and entering the generated correction values into a calibration memory associated with the vertical color image sensor.

BRIEF DESCRIPTION OF THE DRAWING FIGURES

The invention will be explained in more detail in the following with reference to embodiments and to the drawing in which are shown.

DETAILED DESCRIPTION

Persons of ordinary skill in the art will realize that the following description of the present invention is illustrative only and not in any way limiting. Other embodiments of the invention will readily suggest themselves to such skilled persons Referring first of all to FIG. 1 a block diagram shows an illustrative digital camera 10 including a vertical color pixel image sensor 12. A mechanical shutter 14 is positioned in between the vertical color pixel image sensor 12 and a lens 16.

Figure 1:
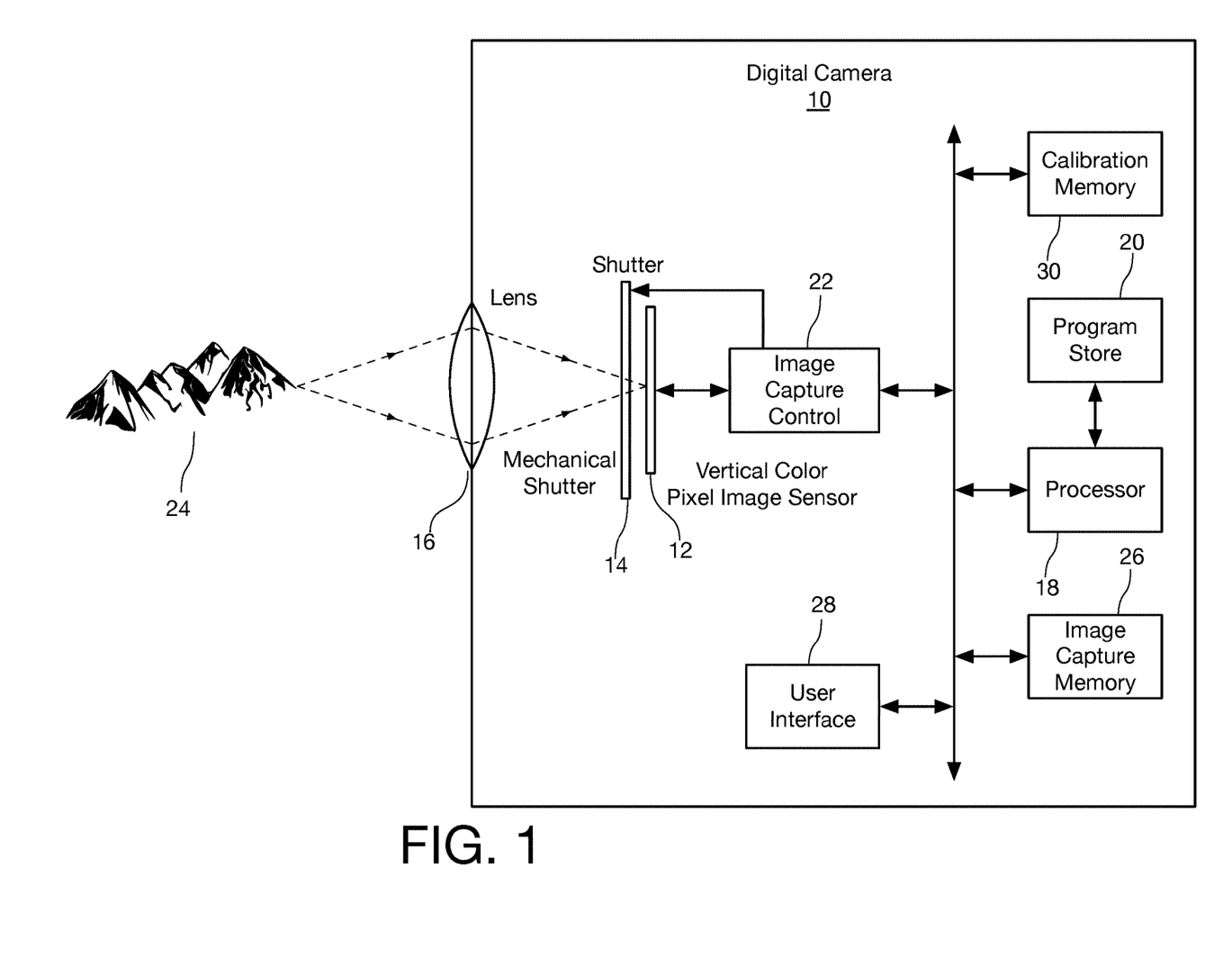
FIG. 1 is a block diagram showing an illustrative digital camera including a vertical color pixel image sensor.

A processor 18 disposed in the camera body directs the operation of the camera in capturing images by running program software stored in program store 20 as is known in the art. The processor 18 directs image capture control unit 22 that controls the operation of the vertical color pixel image sensor 12 and the mechanical shutter 14 to capture images of a scene 24 and store them in image capture memory 26 under the control of user interface 28.

During the manufacture and assembly process for the vertical color pixel image sensor 12 it is inevitable that defects will be introduced into some of the finally packaged assemblies containing some of the vertical color pixel image sensors 12. While some of these defects are severe enough to require rejecting the color pixel image sensor 12 as being partially or completely inoperative, other ones of these defects, especially those in the integrated circuit portion of the sensor array, can be addressed by calibrating the outputs of out-of-specification pixel sensors in the vertical color pixel image sensor 12. During testing of the individual vertical color pixel image sensors 12, such defects are identified, and correction calibration information is created for the out-of-specification pixels. When the digital camera is assembled, the correction information is downloaded to a calibration memory 30 in the camera 10. Each time an image is captured, the correction information stored in the calibration memory 30 is used to correct the output values of the out-of-specification pixel sensors in the vertical color pixel image sensor 12 prior to downloading the image from the camera by the user.

Defects can generally be classified into three categories. On an image sensor itself, a defect is defined as one or more bad pixels. Such defects are usually encountered in clusters of neighboring bad pixels. Pixel cluster defects can typically be caused by impurities in the integrated circuit fabrication process. Chip-surface defects are typically caused by particles unintentionally deposited on the chip surface. This commonly occurs during sensor assembly. Window defects are typically caused by impurities in the glass manufacturing process.

In accordance with one aspect of the present invention, a method classifies defects by characterizing each bad pixel sensor in a defect. Each defective pixel sensor is examined for multiple characteristics.

There are numerous defect classifications. Some examples include a red cluster defect, a high or low red channel response on a bright image, a yellow cluster, a low blue channel response on a bright image, a green cluster, a high green channel response on a bright image, a multi-color cluster, a multi-color high or low response on a dark image, a chip defect, a window defect, a multi-color low response on a bright image.

Defect classification can lower manufacturing costs by reducing yield loss. In addition, yield enhancement efforts are improved by identifying and quantifying sources of defects. Identifying and quantifying types of defects is important for defect correction.

In accordance with an aspect of the present invention, defects may be classified into three categories: pixel clusters, chip-surface defects, and window defects.

Classification is done by characterizing each defective pixel sensor in multiple ways including color-channel content, response levels relative to neighboring pixel sensors, performance per image type, and response at different bright levels. Classification also includes distinguishing between chip surface defects and window defects. Analysis of defects at different apertures helps to distinguish between these different types of defects.

Classification of defects improves yield enhancement capability and better identifies which defects can be corrected with software calibration. This allows for lower manufacturing costs and contributes to other cost reduction activities, making them more efficient by identifying the sources of defects. It identifies what is most critical for in-camera image quality defects and sets appropriate limits for them.

Defect correction in accordance with another aspect of the present invention identifies which defects can be corrected during the system's final calibration stage. Since it can quantify different defects, it can help to drive decisions on which defects to correct. This improves calibration efficiency and allows for reducing cluster calibration fallout during camera calibration. Information about location, size, and classification of defects can be provided to the final-calibration phase to reduce calibration time. This improved ability to correct defects is an effective way to improve yield and reduce cost The final system of an image sensor can often map and correct certain defects with a calibration step. This correction is typically limited by the memory and processing capabilities of the system. Defect classification information can be used to optimize the correction process. Classifying and quantifying different defects can also guide the choices for defect correction during the system's final calibration step.

Figure 2:
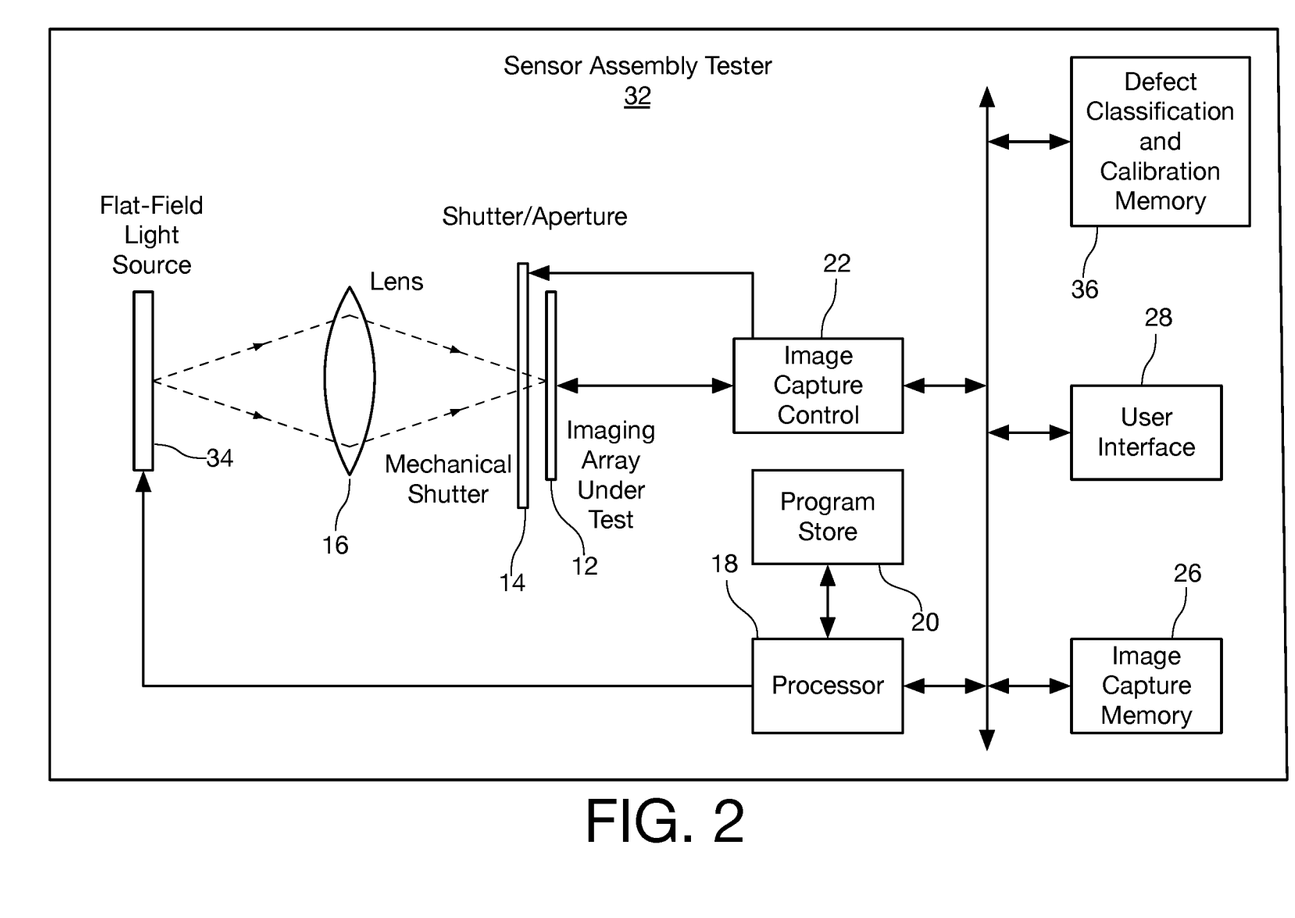
FIG. 2 is a block diagram showing an illustrative sensor assembly tester for defect testing classification and calibration of a vertical color pixel image sensor in accordance with an aspect of the present invention.

Referring now to FIG. 2, a block diagram shows a typical sensor assembly tester 32 that may be used to implement the methods of the present invention. In some ways, the typical sensor assembly tester 32 is similar to the camera 10 of FIG. 1 in that it includes a vertical color pixel image sensor 12. A mechanical shutter 14 is positioned in between the vertical color pixel image sensor 12 and a lens 16. Unlike the camera 10 in which the vertical color pixel image sensor 12 is permanently mounted, the vertical color pixel image sensor 12 in the sensor assembly tester 32 is temporarily mounted for testing purposes after which it is either rejected or passed for later assembly into a camera like camera 10 of FIG. 1.

A processor 18 disposed in the sensor assembly tester 32 directs the operation of the sensor assembly tester 32 in capturing images by running program software stored in program store 20 as is known in the art. The processor 18 directs image capture control unit 22 that controls the operation of the vertical color pixel image sensor 12, the mechanical shutter 14, and the aperture of the lens 16 to capture test images from a flat-field light source 34 whose output brightness is controlled by the processor and store the test images in an image capture memory 26 under the control of user interface 28.

The program software in program store 20 is configured to implement the methods described herein. It directs the processor to capture images from the flat-field light source, controls the brightness of the flat field light source during the image capture process, and performs all of the analysis on the image data stored in the image capture memory 26 that is used to identify defects, classify the defects, and, when possible, provide correction data for compensating for the defects as well as data classifying the defects that can be used by the manufacturer as taught herein. The correction data is written into the defect classification and calibration memory 36 at locations identifying the particular vertical color pixel image sensor 12 under test. This correction data is downloaded into the calibration memory of the digital camera 10 of FIG. 1 after the particular vertical color pixel image sensor 12 with which the correction data is associated is mounted in the camera 10 during assembly of the camera 10.

Figure 3:
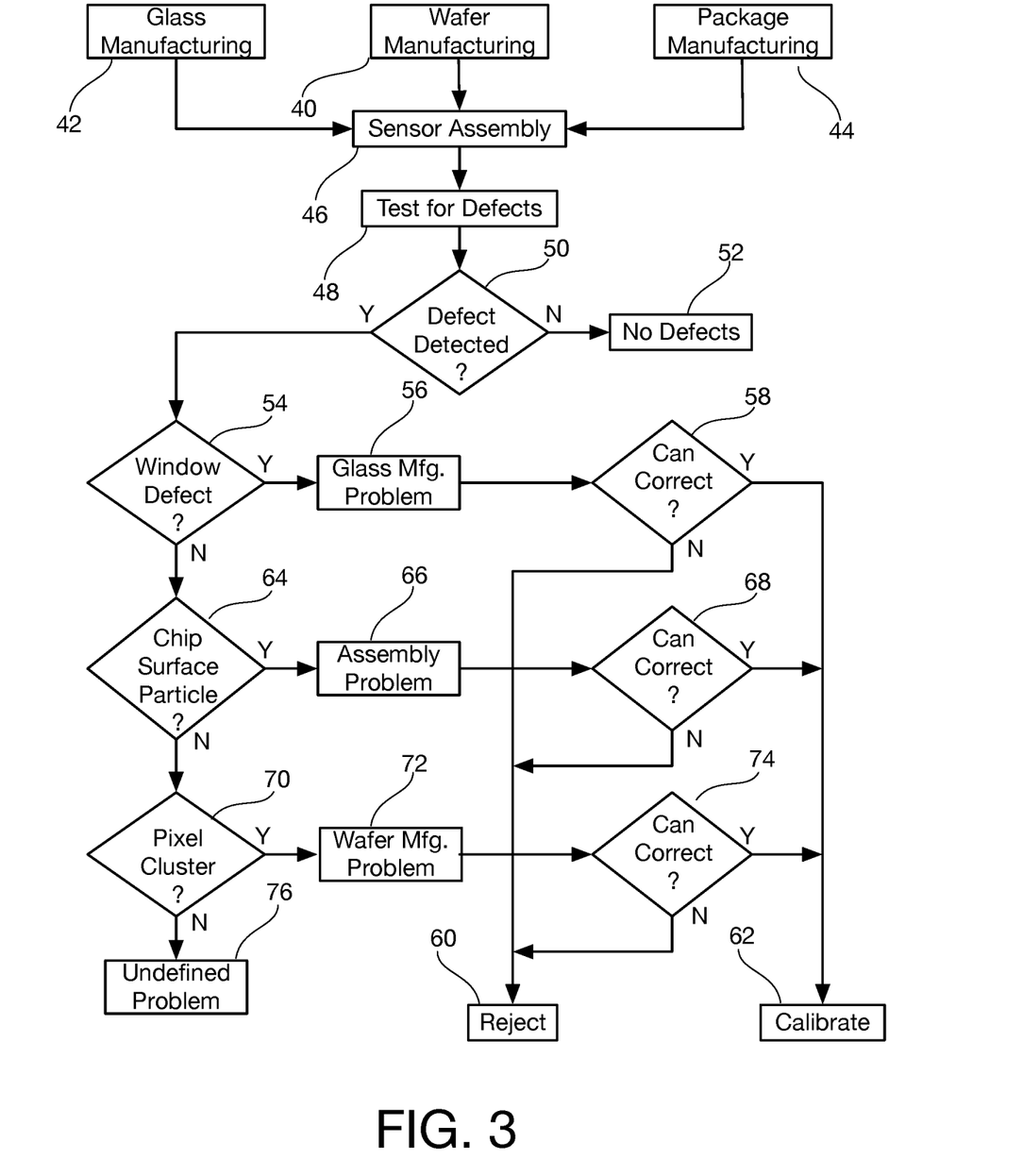
FIG. 3 is a flow diagram showing an illustrative process flow for testing for defects in a vertical color pixel image sensor in accordance with an aspect of the present invention.

Referring now to FIG. 3, a block diagram shows an overview of an illustrative defect testing and characterization process in accordance with one aspect of the present invention. Reference numerals 40, 42, and 44 depict three main components of manufacturing a vertical color pixel image sensor such as the vertical color pixel image sensor 12 shown in FIGS. 1 and 2. The integrated circuit portion is manufactured as silicon wafers which are then scribed and cut into individual die in a wafer fabrication process depicted at reference numeral 40. The glass manufacturing process reference numeral 42. Finally, the die is packaged at reference numeral 44. These three processes result in the final sensor assembly shown at reference numeral 46.

At reference numeral 48, each individual assembled vertical color pixel image sensors are tested for defects as will be further described herein. After the testing has been completed, it is determined for each assembled vertical color pixel image sensor at reference numeral 50 if any defects have been detected. If no defects have been detected, the assembled vertical color pixel image sensor is identified as having no defects 52.

If one or more defects have been identified during testing, the test data is analyzed at reference numeral 54 to determine if the defect is a window defect. If so, at reference numeral 56 the defect is classified as a glass manufacturing problem and at reference numeral 58 it is determined whether the defect can be corrected. If the defect cannot be corrected, the assembled vertical color pixel image sensor is identified as defective at reference numeral 60 and will not be assembled into a digital camera. If the defect can be corrected, at reference numeral 62 calibration data is generated that will modify the output values of the affected color channels of the affected vertical color pixel sensors when the assembled vertical color pixel image sensor is assembled into a camera. The calibration data may be generated at the time that the determination is made at reference numeral 58 that the defects are correctable, or may be generated later, for example when the assembled vertical color pixel image sensor is assembled into a camera.

If at reference numeral 54 it was determined that the defect is not a window defect, the process proceeds to reference numeral 64 where it is determined if the defect is a chip surface particle defect. If so, at reference numeral 66 the defect is classified as an assembly problem and at reference numeral 68 it is determined whether the defect can be corrected by using correction data to modify the output value of the affected color channels. If the defect cannot be corrected, the assembled vertical color pixel image sensor is identified as defective at reference numeral 60 and will not be assembled into a digital camera. If the defect can be corrected, at reference numeral 62 calibration data is generated that will modify the output values of the affected color channels of the affected vertical color pixel sensors when the assembled vertical color pixel image sensor is assembled into a camera.

If at reference numeral 64 it was determined that the defect is not a chip surface particle defect, the process proceeds to reference numeral 70 where it is determined if the defect is a pixel cluster defect, meaning that something is wrong with one or more color channels in one or more vertical color pixel sensors in the vertical color pixel image sensor. If so, at reference numeral 72 the defect is classified as a wafer manufacturing problem and at reference numeral 74 it is determined whether the defect can be corrected by using correction data to modify the output value of the affected color channels. If the defect cannot be corrected, the assembled vertical color pixel image sensor is identified as defective at reference numeral 60 and will not be assembled into a digital camera. If the defect can be corrected, at reference numeral 62 calibration data is generated that will modify the output values of the affected color channels of the affected vertical color pixel sensors when the assembled vertical color pixel image sensor is assembled into a camera.

If at reference numeral 70 it was determined that the defect is not a chip-surface defect, the process proceeds to reference numeral 76 where the defect is classified as an undefined problem.

Persons of ordinary skill in the art will appreciate that the decisions made at reference numerals 54, 64, and 70 do not have to be made in any particular order in accordance with the present invention. The particular order shown in FIG. 3 is shown simply as being illustrative.

According to one aspect of the present invention, defective pixel sensors can be detected by exposing the sensor to a flat field light source and comparing the response of each pixel sensor to the responses of its neighbors. Any pixel sensor that has a response that is too high or too low compared to the responses of its neighbors is classified as defective. This comparison is done for all color channels of each vertical color pixel sensor, and a vertical color pixel sensor is considered defective if any of its color channels is defective.

In accordance with an aspect of the present invention, a two-pass methodology is used for detecting defects. This methodology is used to avoid the inclusion of performance anomalies resulting from cleanable particles on the surface of the sensor assembly as defects.

According to one aspect of the invention, in a first pass, images are captured and are analyzed, and a first-pass defect list is generated. The first pass is implemented by capturing dark images, capturing bright images, and applying pre-processing algorithms to both the dark and light images to reduce noise. The dark images are then used to generate two defective-pixel maps for each color channel. The bright images are then used to generate two defective-pixel maps for each color channel. The defective-pixel maps are combined into a combined defective pixel map. A clustering algorithm is applied to the combined defective-pixel map to generate a defect list. The defect list contains defect classification, size, and boundary coordinates for each defect identified on the defect list.

After the first pass, the sensor glass is cleaned. A second pass is performed in which images are again captured and analyzed, and a second-pass defect list is created.

Figure 4:
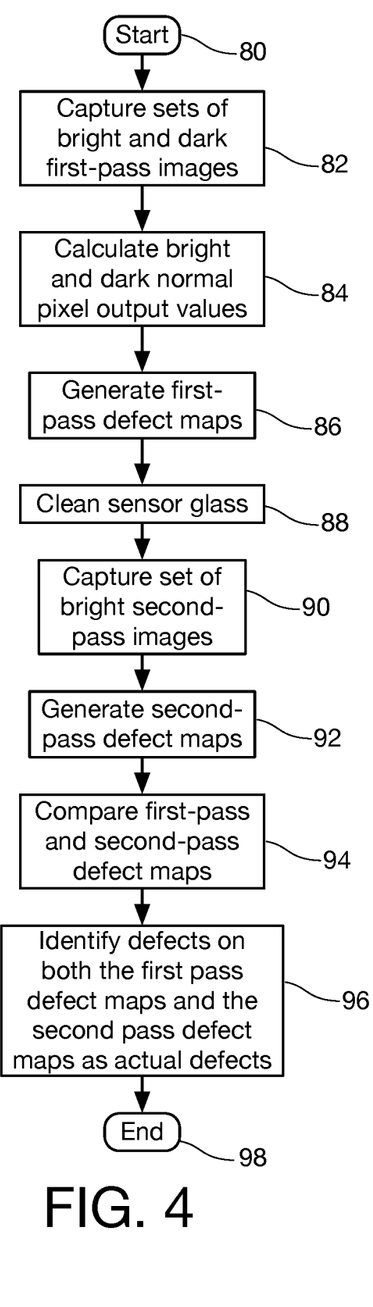
FIG. 4 is a flow diagram showing an illustrative process flow for generating defect maps in accordance with an aspect of the present invention.

Referring now to FIG. 4, a block diagram shows an illustrative method for testing each vertical color pixel image sensor in accordance with an aspect of the invention. The method starts at reference numeral 80.

First, at reference numeral 82, a set of bright first-pass images including at least two bright first-pass images and a set of dark first-pass images including at least two first-pass dark images are captured by the vertical color pixel image sensor. Dark images are captured with the vertical color pixel image sensor set for different exposure times, a short exposure time and a long exposure time. As a non-limiting example, the short exposure time may be about 1 mSec and the long exposure time may be about 4 Sec.

According to a non-limiting example, the set of dark first-pass images can be captured by leaving the mechanical shutter closed. Persons of ordinary skill in the art will appreciate that other low light levels can be used to capture the dark first-pass images.

The set of bright first-pass images are captured using a flat-field light source at different brightness levels. According to one non-limiting example, two different brightness levels to which the flat-field light source is set can be 20% of full-scale pixel sensor brightness and 80% of full-scale pixel sensor brightness. Persons of ordinary skill in the art will appreciate that other brightness levels may be chosen for capturing the set of bright first-pass images.

At reference numeral 84 normal pixel output values are calculated from the pixel data captured during the set of bright first-pass images and the set of dark first-pass images. The "normal" pixel output values can be expressed as, for example, lying within a range of ±x % of the average value of the pixel outputs, where x is, for example, 3-5%. The normal pixel output values obtained at reference numeral 84 are used at reference numeral 86 to generate first-pass defect maps as will be further described herein.

Next, at reference numeral 88, the sensor glass is cleaned. The sensor glass is cleaned to prevent light blockage caused by removeable particles on the glass from being characterized as pixel sensor defects. After the sensor glass is cleaned, at reference numeral 90, a set of bright second-pass images are captured by the vertical color pixel image sensor. The set of bright second-pass images are captured using the flat-field light source at the same brightness levels that were used to capture the bright first-pass images at reference numeral 84.

Next, the normal pixel output values obtained at reference numeral 84 are used at reference numeral 92 to generate second-pass defect maps as will be further described herein. At reference numeral 94, the first-pass defect maps are compared with the second-pass defect maps. At reference numeral 96, defects that are identified on both the first-pass defect maps and the second-pass defect maps are identified as actual defects. The method ends at reference numeral 98.

Persons of ordinary skill in the art will observe that the comparison of the first-pass and second-pass defect maps prevents light blockage caused by removeable particles on the glass from being characterized as pixel sensor defects since the sensor glass cleaning performed at reference numeral 88 substantially eliminates such blockage.

Figure 5:
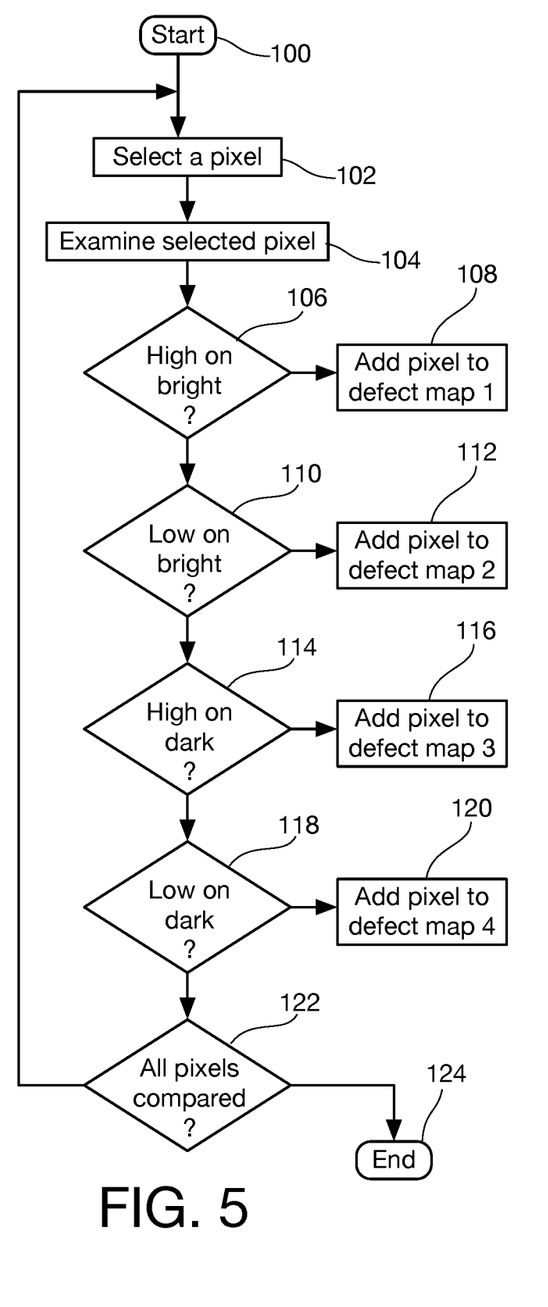
FIG. 5 is a flow diagram showing an illustrative process flow depicting in more detail capturing multiple images and generating defect maps in accordance with an aspect of the present invention.

Referring now to FIG. 5, a block diagram shows an illustrative method for creating the first-pass and second-pass defect maps in accordance with an aspect of the invention. The method starts at reference numeral 100.

At reference numeral 102, a pixel is selected for examination. At reference numeral 104 the output values for all of the color channels of the selected pixel from the captured bright first-pass and second-pass images and the dark first-pass images are compared with the normal pixel output values that were calculated from the pixel data captured during the bright first-pass images and the dark first-pass images at reference numeral 84. At reference numeral 106 it is determined whether the outputs from any of the color channels of the selected pixel captured in the bright images are "high", meaning that they are outside of the high end of the range considered to be normal. If so, at reference numeral 108 this pixel is added to a defect map 1 indicating which color channels are "high" on bright.

At reference numeral 110 it is determined whether the outputs from any of the color channels of the selected pixel captured in the bright images are "low", meaning that they are outside of the low end of the range considered to be normal. If so, at reference numeral 112 this pixel is added to a defect map 2 indicating which color channels are "low" on bright.

At reference numeral 114 it is determined whether the outputs from any of the color channels of the selected pixel captured in the dark image are "high", meaning that they are outside of the high end of the range considered to be normal. If so, at reference numeral 116 this pixel is added to a defect map 3 indicating which color channels are "high" on dark.

At reference numeral 118 it is determined whether the outputs from any of the color channels of the selected pixel captured during the dark image are "low", meaning that they are outside of the low end of the range considered to be normal. If so, at reference numeral 120 this pixel is added to a defect map 4 indicating which color channels are "low" on dark.

According to one aspect of the invention, the range considered to be normal is symmetrical and is ±x % of the average value of the pixel outputs. In one instance of the invention x is between 2% and 5%. According to other aspects of the invention the range can be asymmetrical.

At reference numeral 122 it is determined whether all pixels have been examined. If so, the method ends at reference numeral 124. If not, the method returns to reference numeral 102, where another pixel is selected for examination. The method proceeds through reference numerals 104 through 122 until all pixels have been examined. Persons of ordinary skill in the art will appreciate that the order in which the pixel output values are examined at reference numerals 106, 110, 114, and 118 is arbitrary and that the order shown in FIG. 5 is by way of example only.

Figure 6:
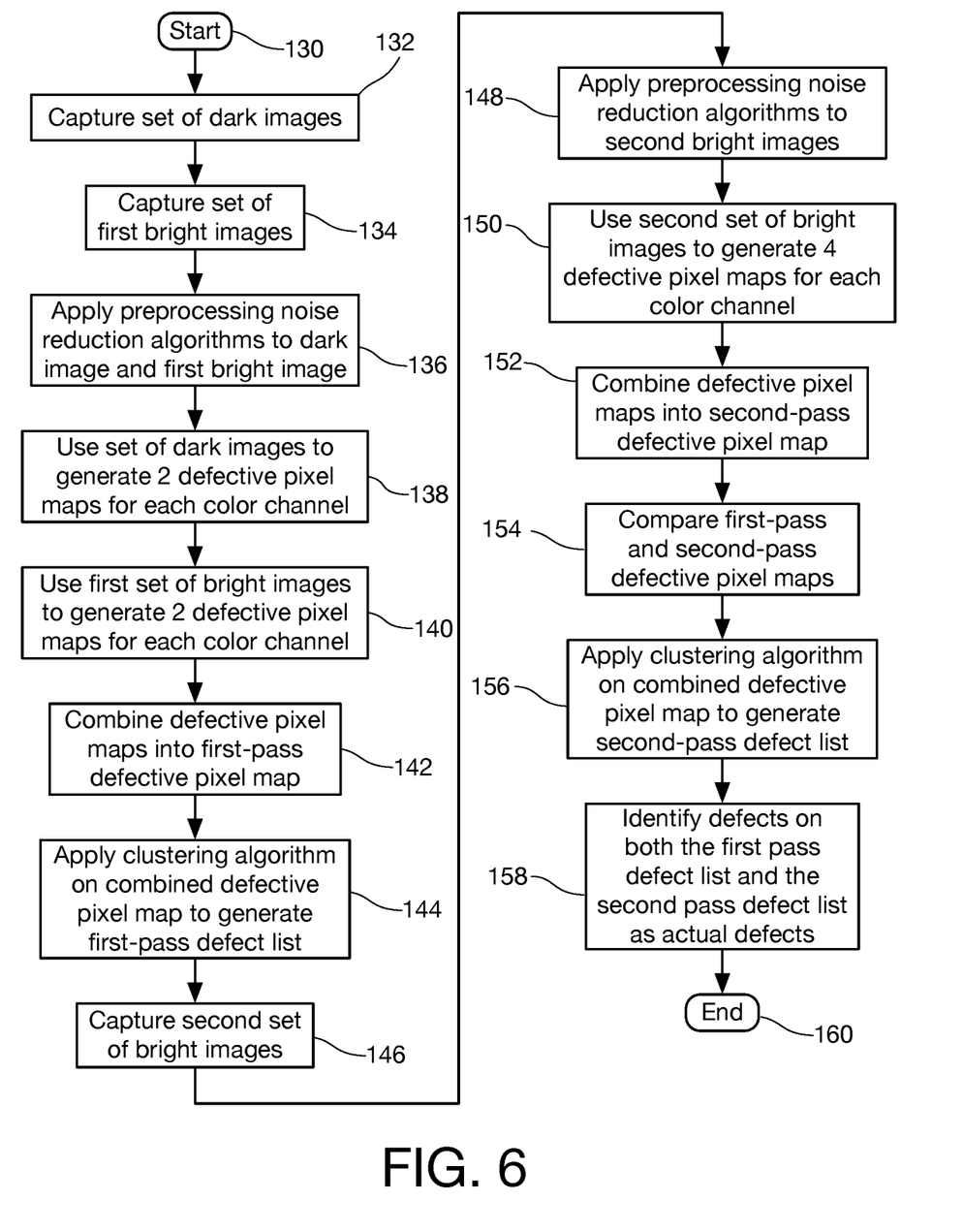
FIG. 6 is a flow diagram showing an illustrative process flow depicting a method for identifying defects in accordance with an aspect of the present invention.

Referring now to FIG. 6, a block diagram shows a more detailed description of the method depicted in FIGS. 4 and 5. The method begins at reference numeral 130.

At reference numeral 132 a set of dark images is captured as previously described. At reference numeral 134, a set of first-pass bright images are captured. Before the data is examined, at reference numeral 136 one or more pre-processing noise reduction algorithms are applied to the dark image data and the bright image data. Noise-reduction algorithms such as smoothing filters or non-linear filters may be employed.

At reference numerals 138 and 140 the dark image data and the image data from the first-pass bright images are used to separately generate the four defective pixel maps for each color channel for both dark and bright image data as was described with reference to FIG. 5. The order in which this is done is arbitrary. At reference numeral 142, the defective pixel maps are combined into a first-pass defective pixel map. At reference numeral 144 a clustering algorithm is applied on the combined first-pass defective pixel map to generate a first-pass defect list. The clustering algorithm determines how many contiguous neighboring pixels are contained within each defect cluster.

At reference numeral 146, a set of second-pass bright images are captured. Before the data is examined, at reference numeral 148 one or more pre-processing noise reduction algorithms are applied to the second-pass bright image data. Noise-reduction algorithms such as smoothing filters or non-linear filters may be employed.

At reference numeral 150 and 152 the image data from the second-pass bright images are used to generate the four defective pixel maps for each color channel for the second-pass bright image data as was described with reference to FIG. 5. The order in which this is done is arbitrary. At reference numeral 152, the defective pixel maps are combined into a second-pass defective pixel map.

At reference numeral 154, the first-pass defect maps are compared with the second-pass defect maps. At reference numeral 156 a clustering algorithm is applied on the combined second-pass defective pixel map to generate a second-pass defect list. The clustering algorithm may be the same algorithm used at reference numeral 144.

At reference numeral 158, defects that are identified on both the first-pass defect maps and the second-pass defect maps are identified as actual defects. The method ends at reference numeral 160.

With respect to the image sensor itself, defective pixels may be classified according to defect type by one or more characteristics of the pixel. A first characteristic is color-channel content of each individual pixel. This characteristic reflects whether one or more color channels in the pixel are defective. Classification of bad color channel content can be any combination of color channels being defective in some manner A single one of the red, green, or blue color channels can be defective. Two color channels, i.e., red and blue color channels, green and blue color channels, or red and green color channels can be defective. In addition, all of the red, green, and blue color channels can be defective.

A second characteristic that can be used in accordance with the present invention to classify pixel defects reflects response levels of the defective pixel sensor relative to neighboring pixel sensors and is characterized by whether the response levels of the defective pixel sensor are too high or too low. Each color channel of a defective pixel is characterized for whether its response level is above or below the response level of its neighbors.

A third characteristic that can be used in accordance with the present invention to classify pixel defects reflects the performance of the pixel with respect to the type of image captured. Determinations are made whether defects occur on bright images, dark images, or both bright and dark images. Defective pixels are detected on both dark and bright images. Each bad color channel of all defective pixels is characterized with at least one of four designations: high on bright (a high response on bright image); low on bright: (a low response on bright image); high on dark (a high response on dark image); and low on dark (a low response on dark image).

A fourth characteristic that can be used in accordance with the present invention to classify pixel defects reflects response of the pixel sensor at different brightness levels. Determinations are made concerning whether and if so, how the intensity of the defect changes at different light levels. At least two different bright levels are used to analyze each defective pixel. Analysis of all color channels of each defective pixel at different bright levels generally allows defective pixels to be characterized with one of three characterizations: stuck-at defect; offset defect; and gain defect. These characteristics are determined by comparing defect intensities at the different light levels.

An additional step in the analysis of each defective pixel also allows for classifying pixel defects by distinguishing between a chip-surface defect and a window defect. Analysis of defects at different aperture settings can be used to distinguish between chip-surface defects and window defects. Chip-surface defects generally do not change characteristics at different aperture settings. Window defects tend to change characteristics at different aperture settings. Wider apertures tend to make window defects larger and less distinct.

Figure 7A:
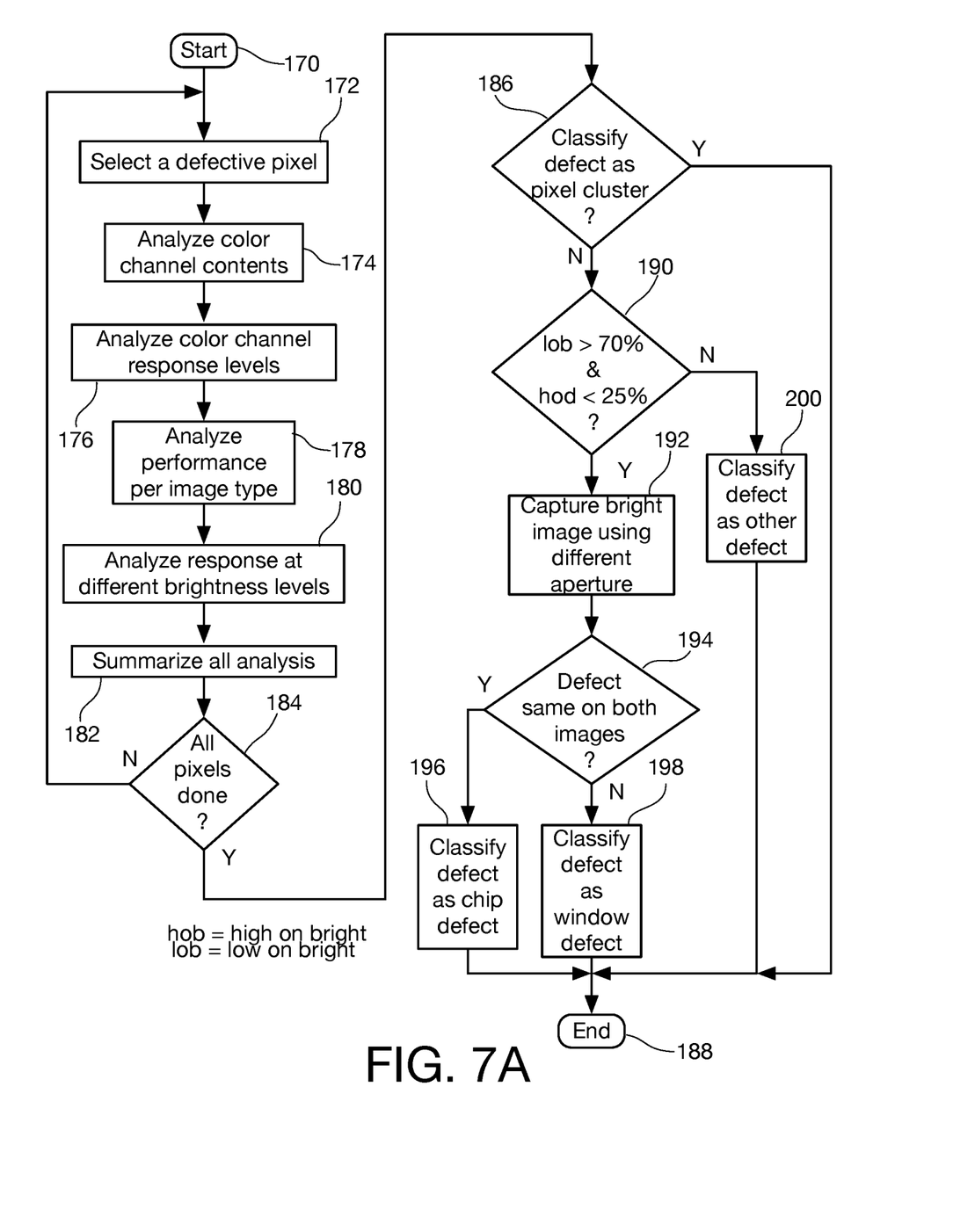
FIGS. 7A and 7B together are flow diagrams showing an illustrative process flow depicting a method for classifying defects in accordance with an aspect of the present invention.

Referring now to FIG. 7A, a block diagram depicts an illustrative method for using the defective pixel data to classify defects in the tested assembled vertical color pixel image sensor in accordance with an aspect of the present invention. The method begins at reference numeral 170.

At reference numeral 172, a defective pixel sensor is selected for examination. At reference numeral 174 the color channel content of the selected pixel sensor is examined to determine which color channels are defective. At reference numeral 176 the response levels of each color channel in the selected pixel sensor is analyzed to determine which, color channels have output levels that are too high or too low. At reference numeral 178 the performance per image type is analyzed. This analysis determines whether any detected defect is present in both dark and bright images. At reference numeral 180 the output of each channel in the selected pixel sensor is analyzed at the two different brightness levels to determine whether the defect is an offset defect, gain defect, or stuck-at defect. At reference numeral 182, a list is compiled summarizing the analyses.

At reference numeral 184 it is determined if all defective pixel sensors have been examined. If not, the method returns to reference numeral 172 where another defective pixel sensor is selected and analyzed as detailed in reference numerals 174 through 182.

If at reference numeral 184 it is determined that all defective pixel sensors have been examined, the method proceeds to reference numeral 186 where it is determined whether the defect can be classified as a pixel cluster defect. If so, the method ends at reference numeral 188. If not, the method proceeds to reference numeral 190 where it is determined whether more than a certain predetermined percentage (in one instance of the invention that percentage is 70%) of the pixels in the cluster are low on bright pixels and whether fewer than a certain predetermined percentage (in one instance of the invention that percentage is 25%) of the pixels in the cluster are high on dark pixels. If so, an additional bright image is captured using a different aperture setting at reference numeral 192. At reference numeral 194 it is determined whether the defect is the same on both the image captured with the original aperture setting and the image that had just been captured with the different aperture setting at reference numeral 192. If the defect is the same, the method proceeds to reference numeral 196 where the defect is classified as a chip surface defect and the method ends at reference numeral 188. If the defect is not the same, the method proceeds to reference numeral 198 where the defect is classified as a window defect and the method ends at reference numeral 188.

If, at reference numeral 190 it was determined that the percentages of high on dark and low on bright pixels do not fall into the pre-determined percentages, the method proceeds to reference numeral 200 where the defect is classified as an "other" defect. The method then ends at reference numeral 188.

Persons of ordinary skill in the art will appreciate that the additional bright image captured using a different aperture setting does not need to be captured at this stage of the process. For example, the additional bright image may be captured at the same time the other images are captured.

Figure 7B:
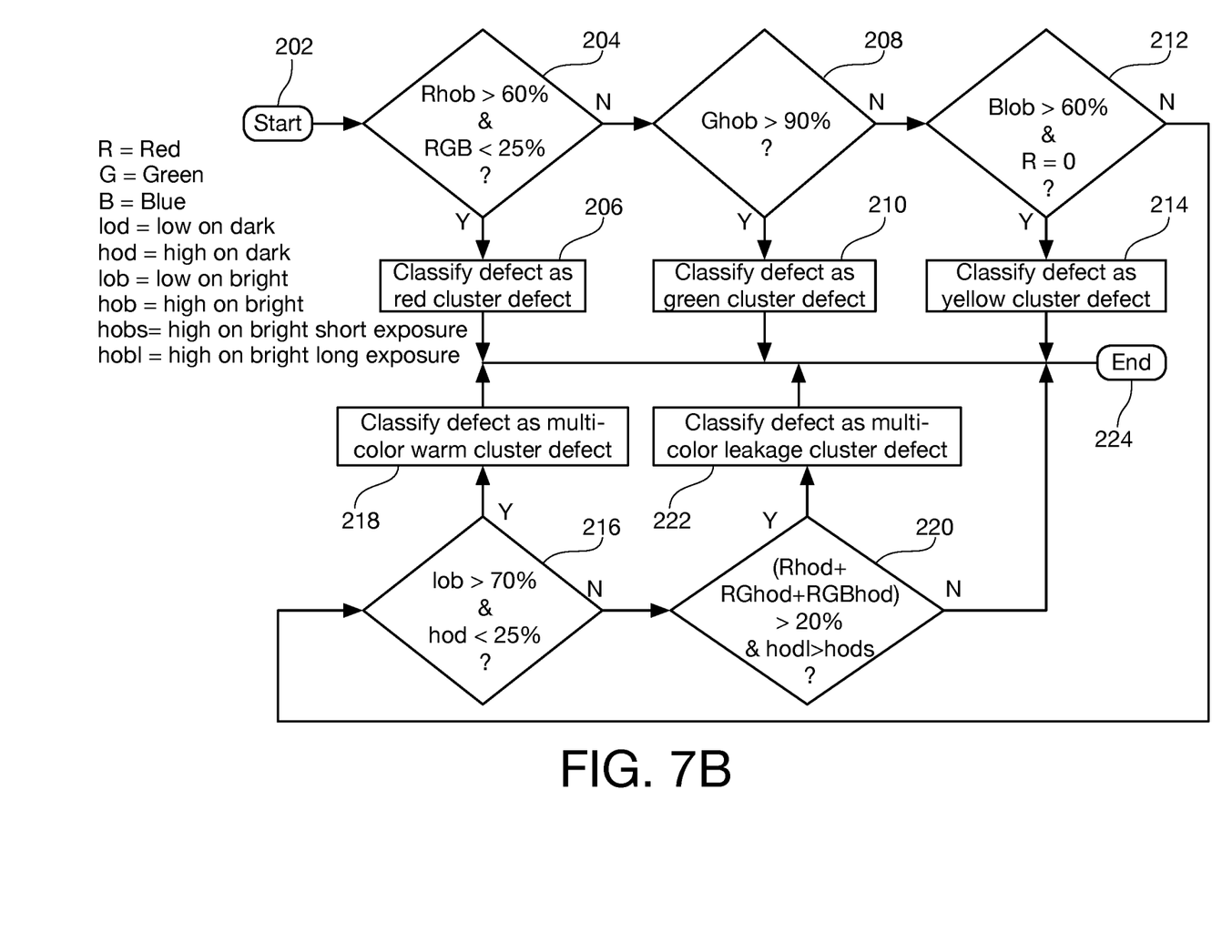

Referring now to FIG. 7B, a flow diagram depicts one method according to the present invention for making the determination at reference numeral 186 of FIG. 7A whether a cluster defect can be classified as a pixel cluster defect. Persons of ordinary skill in the art will observe that not all possibilities of pixel cluster defect classifications are shown in FIG. 7B. The particular classifications that are depicted in the flow chart of FIG. 7B are the pixel cluster defects that have been most often encountered and persons skilled in the art will appreciate that other classifications can be included in the type of method shown in FIG. 7B.

The method begins at reference numeral 202. At reference numeral 204 it is determined whether more than a certain predetermined percentage (in one instance of the invention that percentage is 60%) of the pixels in the cluster have a red channel that is high on bright and whether fewer than a certain predetermined percentage (in one instance of the invention that percentage is 25%) of all of the red, green, and blue channels in individual pixels in the cluster are defective. If so, at reference numeral 206 the defect is classified as a red cluster defect. If not, the method proceeds to reference numeral 208 where it is determined whether more than a certain predetermined percentage (in one instance of the invention that percentage is 90%) of the pixels in the cluster have a green channel that is high on bright. If so, at reference numeral 210 the defect is classified as a green cluster defect. If not, the method proceeds to reference numeral 212 where it is determined whether more than a certain predetermined percentage (in one instance of the invention that percentage is 60%) of the pixels in the cluster have a blue channel that is low on bright and no red color channels are defective. If so, at reference numeral 214 the defect is classified as a yellow cluster defect. If not, the method proceeds to reference numeral 216 where it is determined whether more than a certain predetermined percentage (in one instance of the invention that percentage is 70%) of the individual pixels in the cluster have one or more color channels that are low on bright and whether fewer than a certain predetermined percentage (in one instance of the invention that percentage is 25%) of the individual pixels in the cluster have one or more color channels that are high on dark. If so, at reference numeral 218 the defect is classified as a multi-color warm cluster defect.

If not, the method proceeds to reference numeral 220 where it is determined whether more than a certain predetermined percentage (in one instance of the invention that percentage is 20%) of the pixels in the cluster have a red, red and green or red, green and blue channel that is high on dark with a long exposure and whether the number of pixels that are high on dark with a long exposure is greater than the number of pixels that are high on dark with a short exposure. If so, at reference numeral 222 the defect is classified as a multi-color leakage defect. If not, the method ends at reference numeral 224 and the output of the decision diamond 186 in FIG. 7A returns a "no" result because the defect has not been classified as a pixel cluster defect. Persons of ordinary skill in the art will observe that the order in which the decisions at reference numerals 204, 208, 212, 216, and 220 are made is arbitrary and the present invention contemplates no particular order in making these individual decisions.

Figure 8:
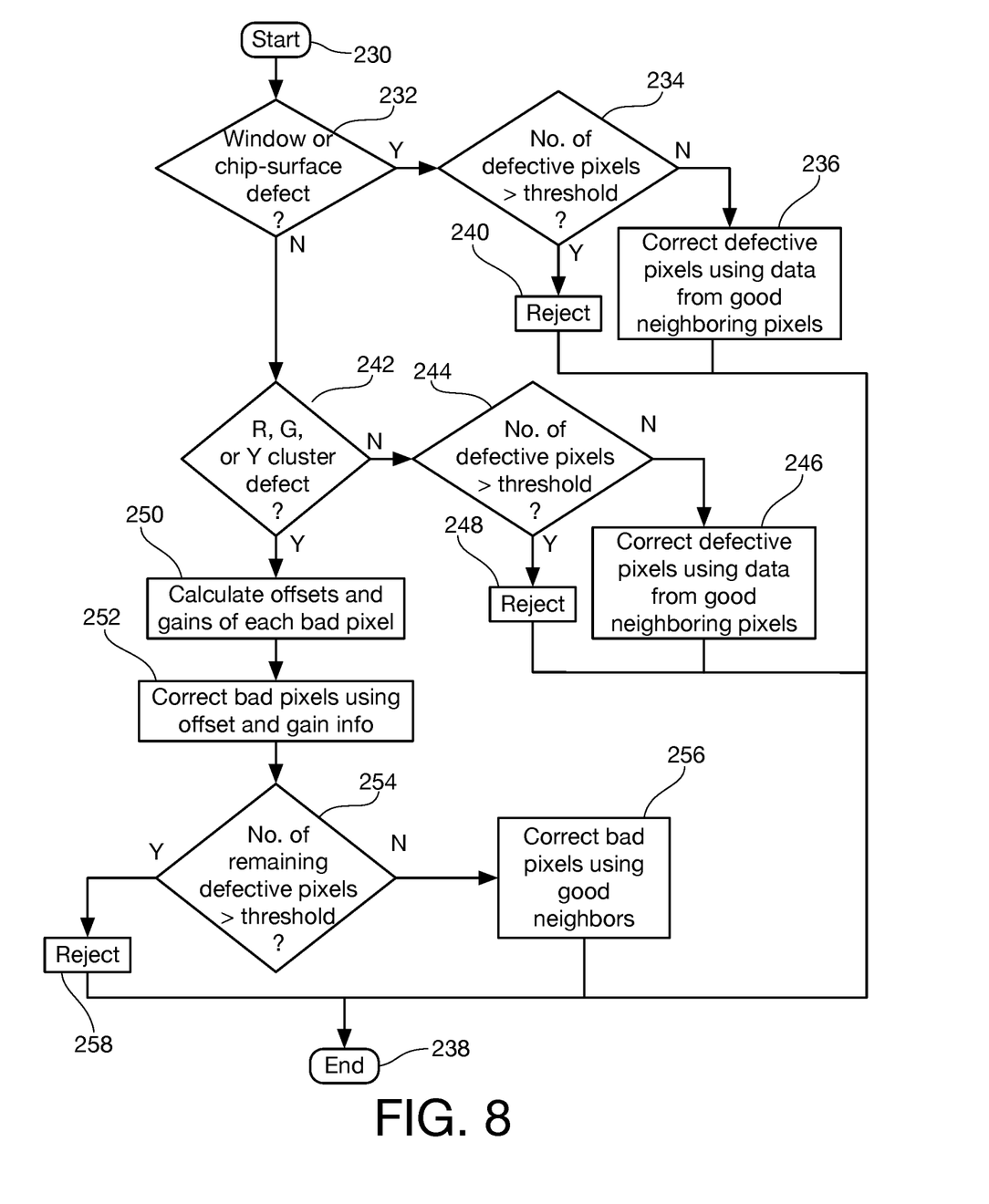
FIG. 8 is a flow diagram showing an illustrative process flow depicting an illustrative method for correcting defects in the tested assembled vertical color pixel image sensor in accordance with an aspect of the present invention.
Figure 9:
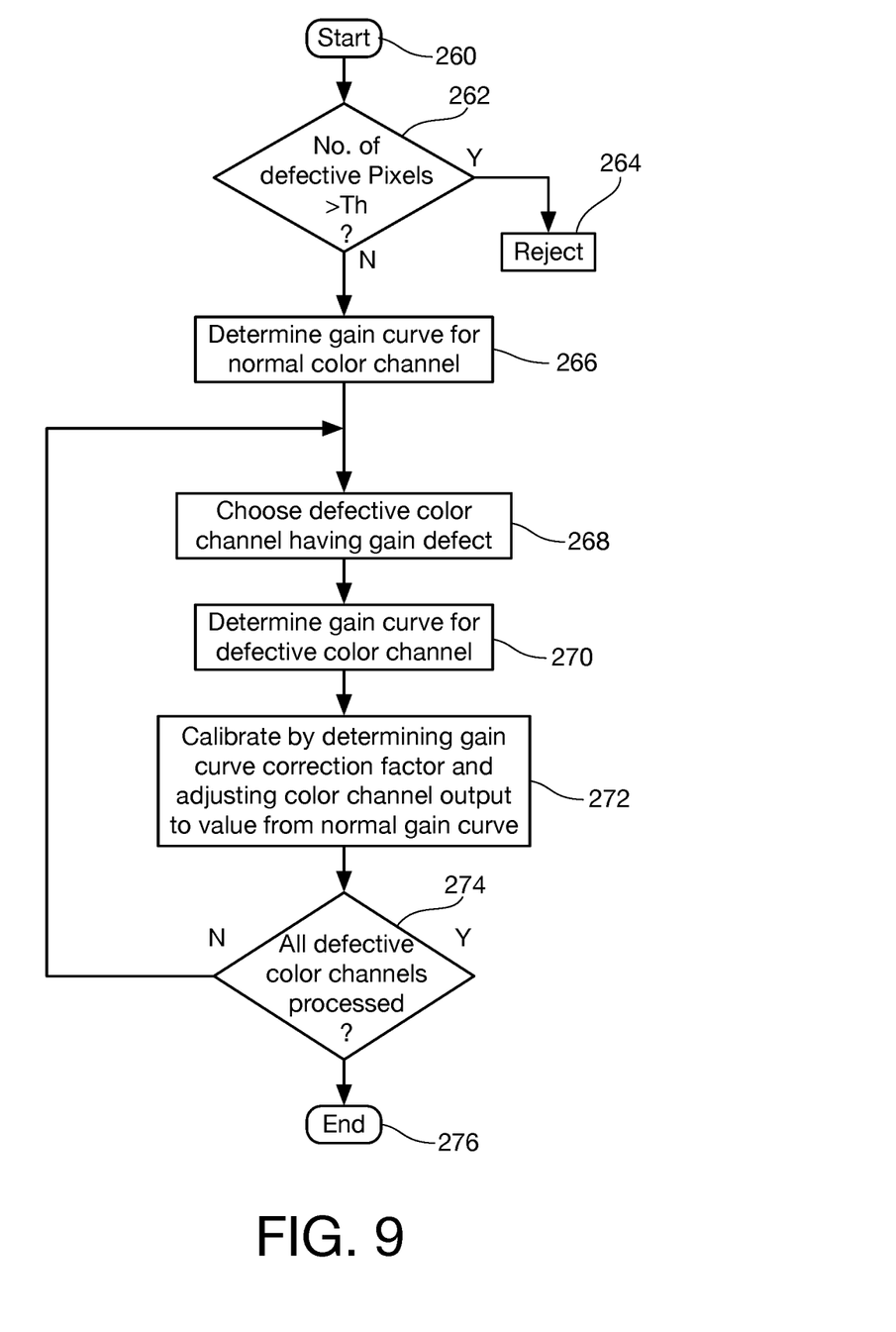
FIG. 9 is a flow diagram showing an illustrative process flow depicting an illustrative method for calibrating a color channel having a gain defect in accordance with an aspect of the present invention.
Figure 10:
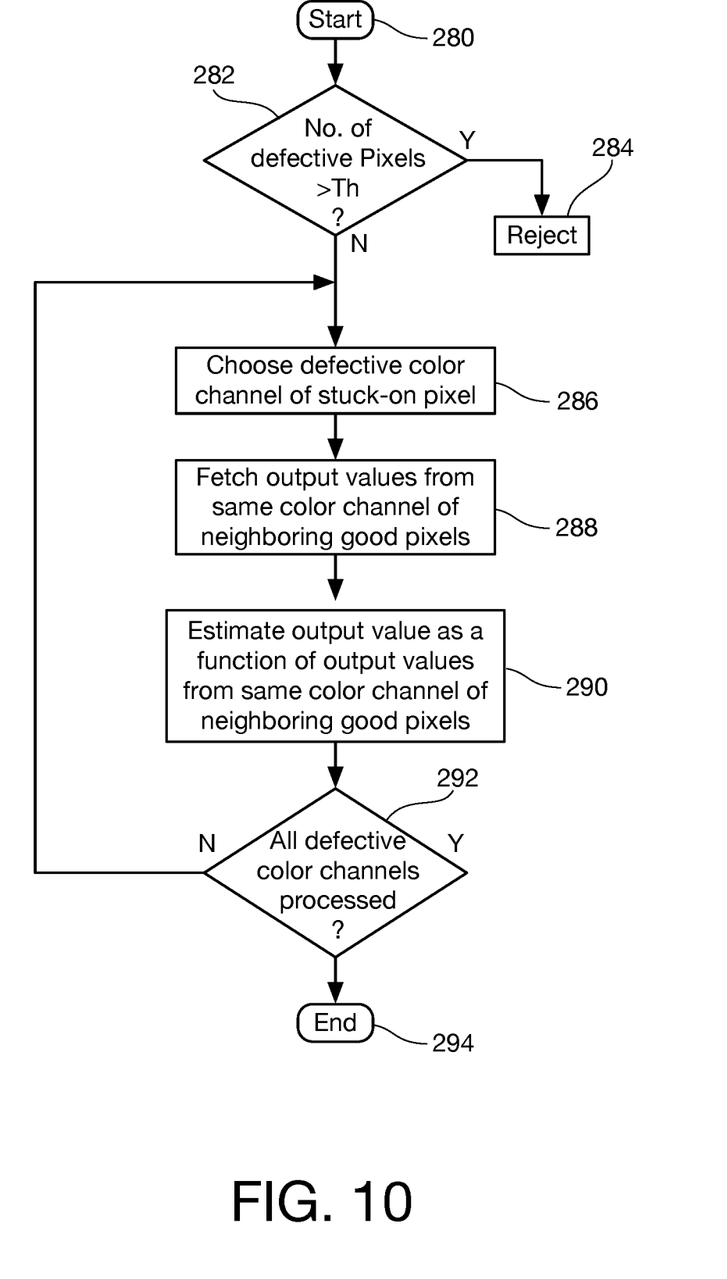
FIG. 10 is a flow diagram showing an illustrative process flow depicting an illustrative method for calibrating a color channel having a stuck-on pixel defect in accordance with an aspect of the present invention.

Referring now to FIG. 8, a block diagram depicts an illustrative method for correcting defects in the tested assembled vertical color pixel image sensor in accordance with an aspect of the present invention. The method begins at reference numeral 230.

At reference numeral 232 it is determined whether the defect is classified as a window defect or a chip-surface defect. An illustrative process for doing so is shown in FIG. 7A. If so, the method proceeds to reference numeral 234 where it is determined whether the number of defective pixels exceeds a predetermined threshold corresponding to a maximum defect cluster size for which correction is possible. According to one aspect of the invention the threshold may be between about 9 and about 64 pixels. The actual number for any given imager will depend on several factors, including the type of defect classification (e.g., single or multiple channel defect) the processing power of the in-camera processor, the correction algorithm (including gain correction algorithms, offset correction algorithms, and good-neighbor algorithm corrections) used. If correction is not possible, the method proceeds to reference numeral 236 where the pixel data is corrected using pixel data from non-defective neighboring pixel sensors. The method then ends at reference numeral 238. If the number of defective pixels exceeds the predetermined threshold, the vertical color pixel image sensor is rejected at reference numeral 240 and the method ends at reference numeral 238.

If at reference numeral 232 it is determined that the defect is not a window defect or a chip-surface defect, the defect is classified as a pixel cluster defect and the method proceeds to reference numeral 242 where it is determined whether the defect is a red cluster defect, a green cluster defect, or a yellow cluster defect. An illustrative method for making this determination was shown in FIG. 7B.

If the defect is not classifiable as a red cluster defect, a green cluster defect, or a yellow cluster defect, the method proceeds to reference numeral 244 where it is determined whether the number of defective pixels exceeds a predetermined threshold corresponding to a maximum defect cluster size for which correction is possible. If not, the method proceeds to reference numeral 246 where the pixel data is corrected using pixel data from non-defective neighboring pixel sensors. The method then ends at reference numeral 238. If the number of defective pixels exceeds a predetermined threshold the die is rejected at reference numeral 248 and the method ends at reference numeral 238.

If at reference numeral 242 the defect is classifiable as a red cluster defect, a green cluster defect, or a yellow cluster defect, the method proceeds to reference numeral 250, where the offsets and gains of each color channel of each bad pixel are calculated. The method then proceeds to reference numeral 252 where the data for color channels in the bad pixel are corrected using the offset and gain information that was calculated at reference numeral 250. Correcting offset and gain errors can help to reduce the size of defective pixel clusters After offset and gain defects are calculated and corrected, the corrected pixels may be used to perform correction of other pixel sensor defects. At reference numeral 254 it is determined whether the number of remaining defective pixels after correcting offset and gain defects exceeds a predetermined threshold corresponding to a maximum defect cluster size for which correction is possible. If not, the method proceeds to reference numeral 256 where the pixel data is corrected using pixel data from non-defective neighboring pixel sensors. If the number of defective pixels exceeds a predetermined threshold the die is rejected at reference numeral 258 and the method ends at reference numeral 238.

In accordance with the present invention, the predetermined thresholds used in the decisions at reference numerals 234, 244, and 254 correspond to the maximum size of a defect cluster whose pixel data can be corrected. The threshold depends on several factors, including the processing power of the processor 18 and the size of the calibration memory 30 in the digital camera 10 of FIG. 1.

An additional factor limits the size of a defect cluster that can be corrected. The correction using good neighboring pixel sensor data at reference numeral 256 is performed starting with pixel sensors located at the outside edges of the defect cluster where good data may be obtained from neighboring non-defective pixel sensors and progresses inwardly to pixel sensors towards the center of the defect using the corrected values of the outer pixel sensors as "good" pixel data. The number of "good" pixels may have been increased by the operations performed at reference numerals 250 and 252, thus reducing the size of the defect cluster. As will be appreciated by persons of ordinary skill in the art, the "corrected" data values are not exactly equal to the actual data values that would have existed if the pixel sensor had not been defective but are close approximations of what actual pixel sensor data values would have been if the pixel sensor was not defective. As the correction process moves inwardly towards the center of the defect cluster, each successive approximation inherits the accuracy error from the preceding corrected pixel sensor data and the "corrected" data value becomes less accurate. At some number of approximations, the accuracy of the correction declines to a value where the corrected data will begin to cause artifacts in the image, limiting the size of a correctable defect cluster.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. In a vertical color image sensor including an array of pixel sensors with multiple color channels, a method of classifying and correcting defects utilizing defective pixel information, the method comprising:

capturing at least two dark images on the vertical color image sensor using a dark flat field;

capturing at least two bright images on the vertical color image sensor using a bright flat field light source;

examining the output of each color channel of each pixel sensor for the captured dark and bright images;

defining output levels of color channels of normal pixel sensors from the at least two bright images and the at least two dark images;

from the at least two dark images identifying and entering into a first defective pixel map pixel sensors having an output in at least one color channel that is lower than the output level at a low end of a range of output levels of a normal pixel sensor;

from the at least two dark images identifying and entering into a second defective pixel map pixel sensors having an output in at least one color channel that is higher than the output level at a high end of the range of output levels of a normal pixel sensor;

from the at least two bright images identifying and entering into a third defective pixel map pixel sensors having an output in at least one color channel that is lower than the output level at the low end of the range of output levels of a normal pixel sensor;

from the at least two bright images identifying and entering into a fourth defective pixel map pixel sensors having an output in at least one color channel that is higher than the output level at the low end of a range of output levels of a normal pixel sensor;

from the first through fourth defective pixel maps classifying the defects in each of the defective pixel sensors by defect type and identifying defective pixel sensors that can be corrected using data from normal neighboring pixel sensors;

determining whether the number of pixel sensors that can be corrected using data from normal neighboring pixel sensors exceeds a threshold number of defective pixel sensors;

if the number of pixel sensors that can be corrected using data from normal neighboring pixel sensors does not exceed the threshold number of defective pixel sensors, generating and entering into a calibration memory associated with the vertical color image sensor correction values for identified defective pixel sensors that can be corrected; and if the number of pixel sensors that can be corrected using data from normal neighboring pixel sensors does not exceed the threshold number of defective pixel sensors, rejecting the vertical color pixel sensor as defective.

2. The method of claim 1 wherein defining output levels of color channels of normal pixel sensors from the at least two bright images and the at least two dark images comprises defining output levels of color channels of pixel sensors lying within a range of ±x % of the average value of the pixel outputs as normal pixel sensors.

3. The method of claim 2 wherein x is between 2% and 5%.

4. The method of claim 1 further comprising:
installing the vertical color image sensor into a digital camera; and
downloading into a calibration memory in the digital camera the correction values for identified defective pixel sensors of the vertical color image sensor that can be corrected.

5. The method of claim 1 wherein the threshold number is between 9 and 64 pixels.

6. The method of claim 5 wherein the threshold number of pixel sensors that can be corrected using data from normal neighboring pixel sensors depends on the classification assigned to the defect.

7. The method of claim 1 further comprising:
cleaning a window covering the vertical color image sensor;
re-performing the method of claim 1; and
deleting from the defective pixel maps any pixel sensors whose outputs are equal to outputs of normal pixel sensors after cleaning a window covering the vertical color image sensor.

8. The method of claim 1 wherein generating and entering into a calibration memory associated with the vertical color image sensor correction values for identified defective pixel sensors that can be corrected comprises generating and entering into the calibration memory associated with the vertical color image sensor correction values for identified defective pixel sensors that have offset defects before determining whether the number of pixel sensors that can be corrected exceeds the threshold number of defective pixel sensors.

9. The method of claim 1 wherein generating and entering into a calibration memory associated with the vertical color image sensor correction values for identified defective pixel sensors that can be corrected comprises generating and entering into the calibration memory associated with the vertical color image sensor correction values for identified defective pixel sensors that have gain defects before determining whether the number of pixel sensors that can be corrected exceeds the threshold number of defective pixel sensors.

10. A method of classifying and correcting defects in vertical color pixel sensors in a vertical color pixel image sensor, the method comprising:
capturing at least two dark images on the vertical color image sensor using a dark flat field;
capturing at least two bright images on the vertical color image sensor using a bright flat field light source;
examining the output of each color channel of each pixel sensor for the captured dark and bright images;
defining ranges of output levels of color channels of normal pixel sensors from the at least two bright images and the at least two dark images;
entering into at least one defective pixel map pixels from the at least one bright image and the at least two dark images that have outputs in at least one color channel that are outside of the defined ranges of the output levels of normal pixel sensors;
from data in the defective pixel maps assigning a defect classification to each defective pixel sensor and identifying defective pixel sensors that can be corrected; and
generating correction values for identified defective pixel sensors that can be corrected and entering the generated correction values into a calibration memory associated with the vertical color image sensor.

11. The method of claim 10 further comprising:
generating and entering into the calibration memory associated with the vertical color image sensor correction values for identified defective pixel sensors that have offset defects and generating and entering into the calibration memory associated with the vertical color image sensor correction values for identified defective pixel sensors that have gain defects;
after generating and entering into the calibration memory associated with the vertical color image sensor correction values for identified defective pixel sensors that have offset defects and generating and entering into the calibration memory associated with the vertical color image sensor correction values for identified defective pixel sensors that have gain defects, determining whether the number of pixel sensors that can be corrected exceeds the threshold number of defective pixel sensors;
determining whether the number of pixel sensors that can be corrected using data from normal neighboring pixel sensors exceeds a threshold number of defective pixel sensors;
if the number of pixel sensors that can be corrected using data from normal neighboring pixel sensors does not exceed the threshold number of defective pixel sensors, generating and entering into a calibration memory associated with the vertical color image sensor correction values for identified defective pixel sensors that can be corrected; and
if the number of pixel sensors that can be corrected using data from normal neighboring pixel sensors exceeds the threshold number of defective pixel sensors, rejecting the vertical color pixel sensor as defective.

12. The method of claim 11 wherein defining output levels of color channels of normal pixel sensors from the at least two bright images and the at least two dark images comprises defining output levels of color channels of pixel sensors lying within a range of ±x % of the average value of the pixel outputs as normal pixel sensors.

13. The method of claim 12 wherein x is between 2% and 5%.

* * * * *